United States Patent
Larson et al.

[15] 3,675,801
[45] July 11, 1972

[54] APPARATUS FOR CONVEYING, HANDLING, LOADING, AND UNLOADING OF PALLETIZED MATERIALS

[72] Inventors: Carl B. Larson, 430 South Russell, Monterey Park, Calif. 91754; William T. Gimbel, 740 Chaucer Road, San Marino, Calif. 91108

[22] Filed: April 22, 1970

[21] Appl. No.: 30,628

[52] U.S. Cl. ............................................................214/310
[51] Int. Cl. .........................................................B65g 39/00
[58] Field of Search ..........................................214/310, 6 P

[56] References Cited

UNITED STATES PATENTS

| | | | |
|---|---|---|---|
| 2,888,126 | 5/1959 | Leaman et al. | 214/310 |
| 3,528,576 | 9/1970 | Runyan et al. | 214/310 |
| 3,142,389 | 7/1964 | Bolt | 214/6 P |

FOREIGN PATENTS OR APPLICATIONS

| | | | |
|---|---|---|---|
| 957,236 | 5/1964 | Great Britain | 214/310 |

*Primary Examiner*—Gerald M. Forlenza
*Assistant Examiner*—Lawrence J. Oresky
*Attorney*—Whann & McManigal

[57] ABSTRACT

A flexible method and apparatus facilitating the stacking, storing, loading, unloading, selection, and separation of elongated bar and other similar materials, in which an elongated roller conveyor is sectionalized to provide a main material loading and unloading section in association with a supply feeder section at one end and an exit discharge section at its other end, a pallet pan being provided for the elongated material which can either be conveyed to the main section by means of a crane, fork-life truck or other means, or delivered directly from the feed section of the conveyor. The apparatus also permits an empty unloaded pallet pan to be placed at the main section, and the material independently moved from a supply point into the pan by hoist means or from the conveyor feed station. Powered rollers are operable to selectively shift the loaded pallet pan in opposite directions at the main section, and controllable means provided for vertically adjusting the level of the loaded pallet pan to a normal position in which it may be bodily shifted endwise together with the material therein, or to a lowered position in which the pan will be retained against movement and driving rollers projecting through the pan bottom operated for moving the material endwise independently of the pan. Electrical controls are provided for obtaining the variously required operations and coordinating the loading and unloading movements of the pallet pan and material. Adjustable selectable stop means are provided for terminating the movement of material entering the pallet pan from the feed section of the conveyor.

11 Claims, 8 Drawing Figures

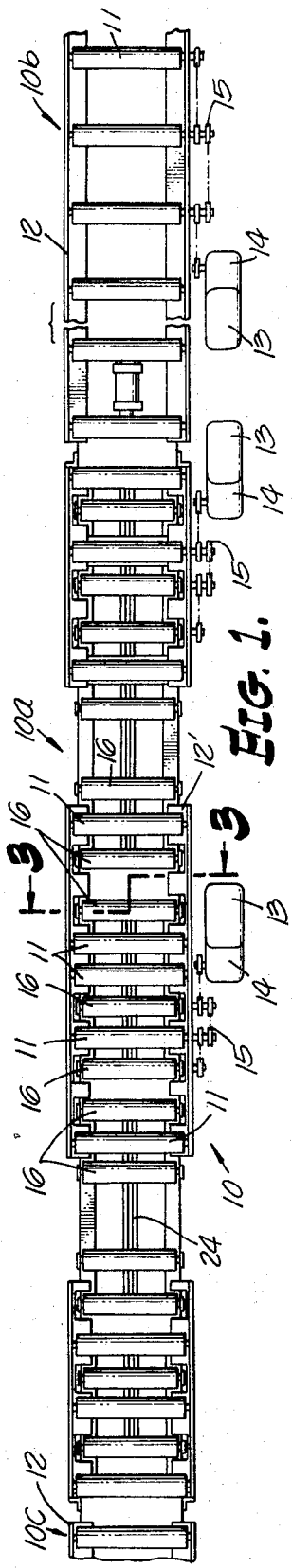
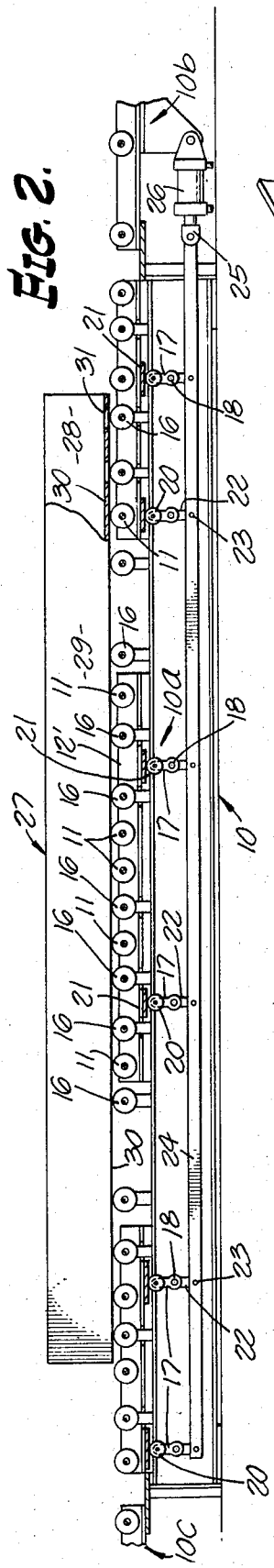
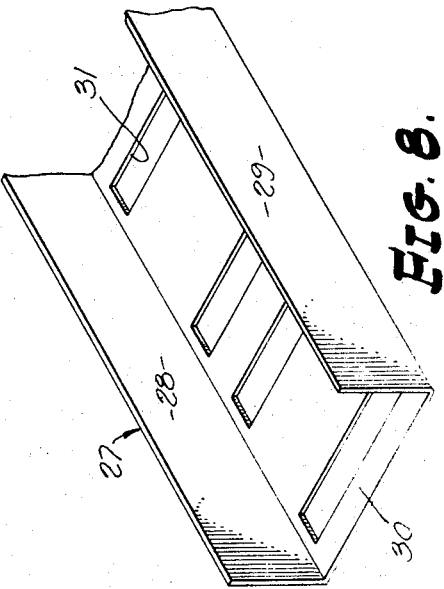
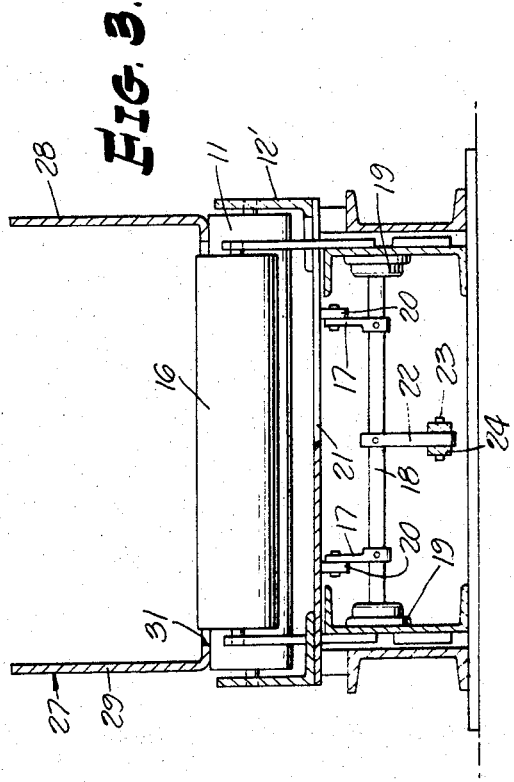

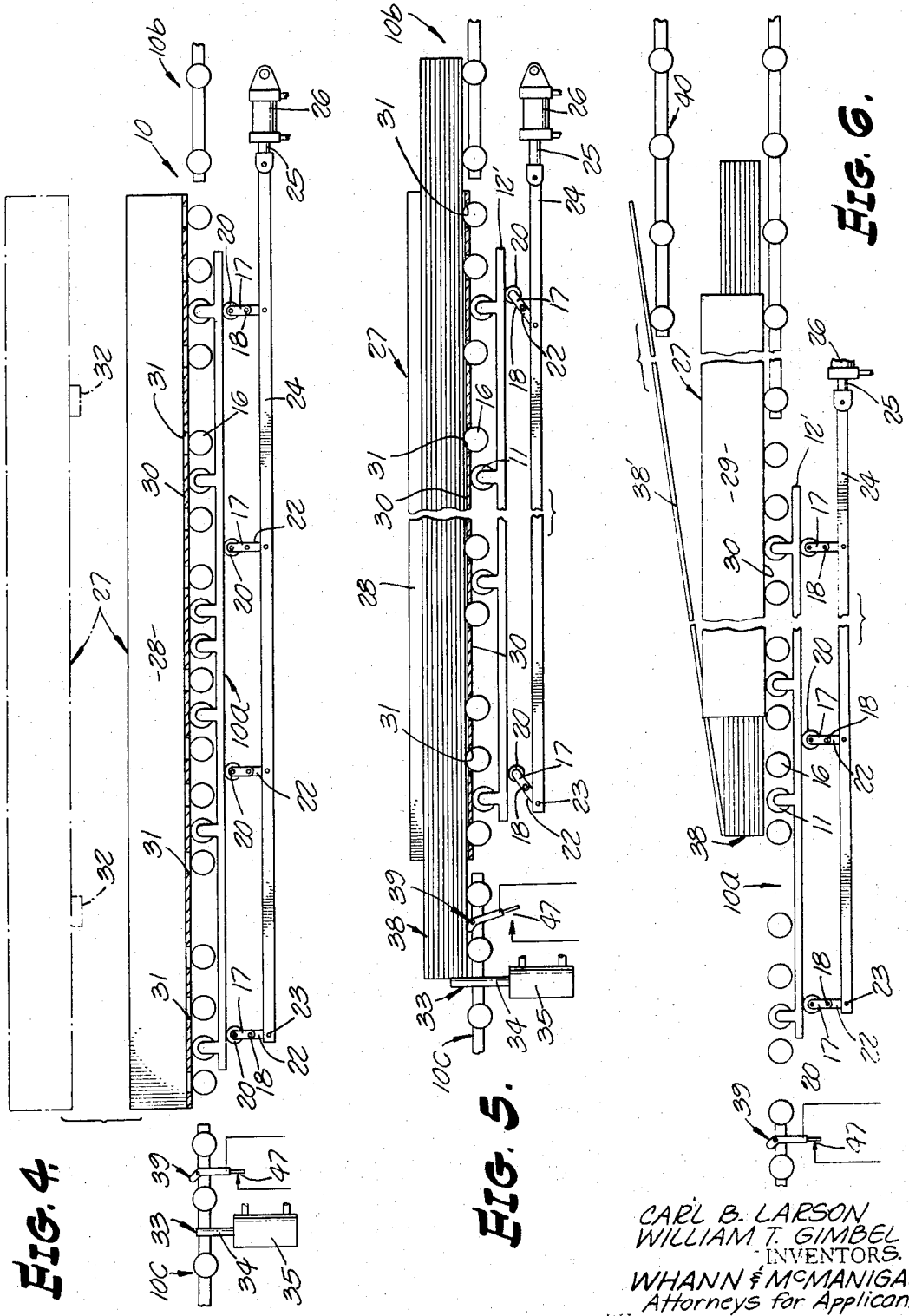

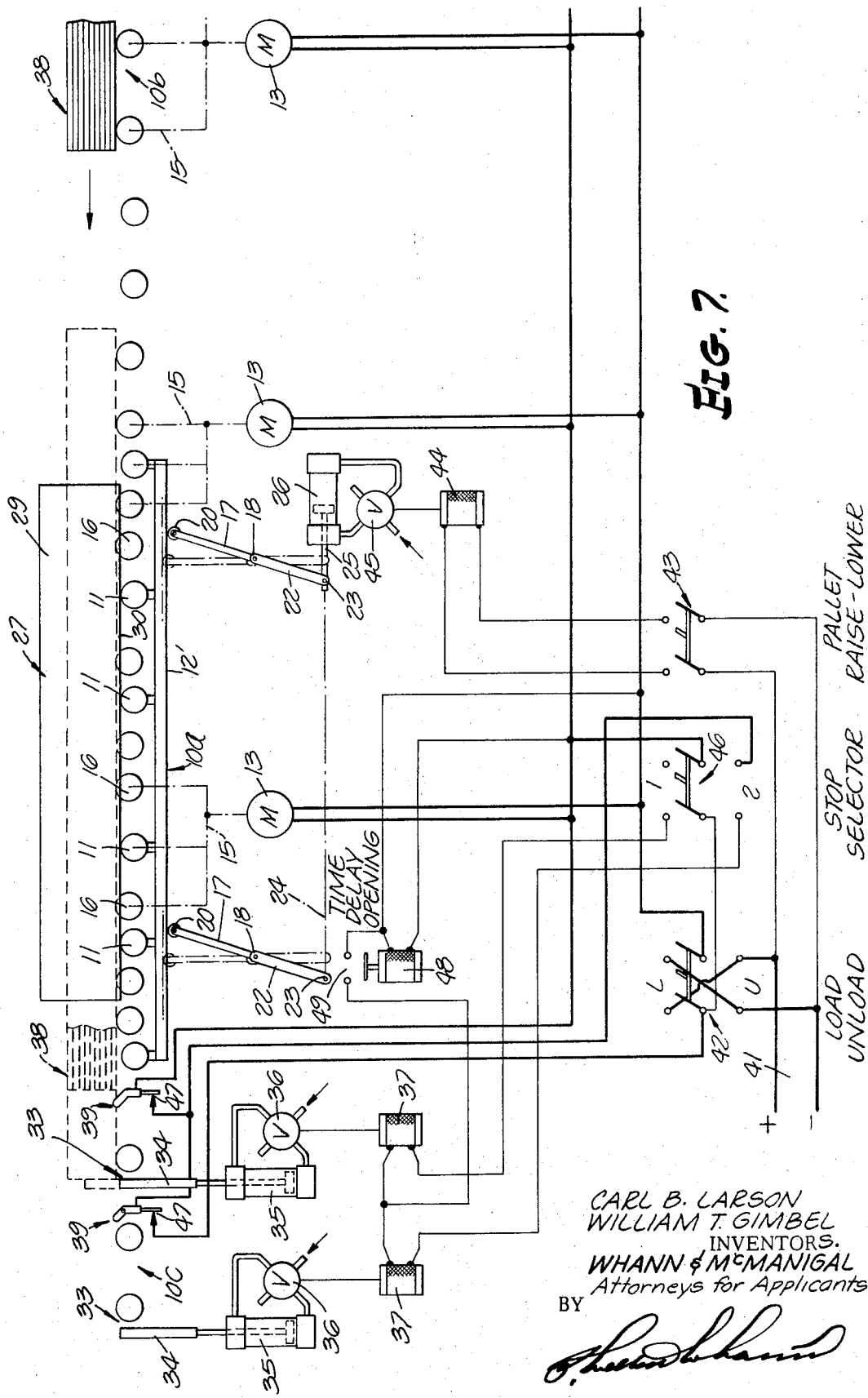

APPARATUS FOR CONVEYING, HANDLING, LOADING, AND UNLOADING OF PALLETIZED MATERIALS

BACKGROUND OF THE INVENTION

The invention relates generally to material handling methods, apparatus and systems.

With the present trend in the metal industry towards the establishment and use of large metal service centers for storage, pre-processing and distribution of structural members, such as long bars of aluminum, steel and the like, the previously known methods, systems and apparatus have proved inadequate and uneconomical for handling the presently required large stocks and varieties of materials which must be maintained, moved, worked and distributed.

The present invention proposes to overcome the inherent existing problems by providing methods and apparatus which will facilitate the handling, particularly of bar type materials, by providing a new concept in the control and utilization of improved conveyor apparatus and pallet pans for materials, together with the use of push-button controlled actuators, motors and other associated devices, whereby greater flexibility and more rapid operations may be obtained.

A prior art search was made, but it disclosed only the broad concepts of conveying materials. The only patent of interest revealed in the search was United States Pat. No. 3,790,527, issued Apr. 30, 1957, covering Merchandise Distributing Apparatus for Warehouses. Briefly, this patent provided a selection transfer device for use with an inclined gravity feed roller conveyor for feeding packages to a stop position adjacent a collecting conveyor, a plurality of rollers being positioned intermediate the rollers at the discharge end of the gravity feed conveyor and being supported for raising and lowering movements as a group so as to operate in raised position to elevate a package at the stop position so that it could clear the stop and move onto the transfer conveyor. The disclosure and teachings of this patent obviously are quite different than applicants' invention, as will hereinafter become more apparent from the detailed description.

SUMMARY OF THE INVENTION

The present invention relates generally to material handling methods, apparatus and systems, and is more particularly concerned with a unique combination of a material handling pallet pan and electrically controlled conveyors.

Having in mind the inherent disadvantages of presently known arrangements for the handling of large quantities of structural materials, it is one object of the herein described invention to provide an improved arrangement in which the handling, the loading, unloading, selection, separation and other desired operations, particularly with reference to elongated bar members and the like, may be economically facilitated and augmented.

It is a further object to provide an improved arrangement or system which utilizes a sectionalized conveyor having a main loading and unloading section provided with a plurality of rollers, including a set of rollers adapted to extend through openings in the bottom of an associated pallet pan, and which rollers are operable to move and shift material contained within the pallet pan.

A further object is to provide in combination with a material handling conveyor, a plurality of selective stops in connection with the loading and unloading section of the conveyor, for positioning material at a desired location to facilitate handling during loading and unloading operations.

A further object is directed to a conveyor and material motion limiting stops, wherein the conveyor has power driven rollers for delivering the material to a loading and unloading section, means being provided to deenergize the conveyor rollers prior to the material reaching the selected stop.

A still further object is to provide in an arrangement as just described above, time delay means for removing the stops at a time interval after the conveyor rollers have been deenergized.

Another object is to provide improved material handling means which will permit the utilization of controlled movements of a pallet pan containing material, to be utilized for transferring material from the pallet to an adjacent elevated conveyor.

Still another object is to provide a unique pallet pan for elongate structure members, the pan having openings in a bottom wall to permit the projection of conveyor rollers into the pan for selectively moving materials therein, and wherein the openings are irregularly spaced in order to key the pan for a particular location on the conveyor.

It is also an object to provide in apparatus embodying the herein disclosed invention, improved electric control means and selective switching which will permit an exceedingly high degree of flexibility in the operation of the various components.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a plan view of a sectionalized conveyor as embodied in the present invention;

FIG. 2 is a slightly enlarged side elevational view of the main loading and unloading section of the conveyor, with an associated pallet pan thereon, and partly in section to show details of mechanism for raising and lowering pan supporting rollers of the conveyor;

FIG. 3 is an enlarged transverse section, taken substantially on line 3—3 of FIG. 1;

FIG. 4 is a view diagrammatically illustrating one manner of placing a pallet pan on the conveyor, the pan supporting rollers being in raised position;

FIG. 5 is a similar view showing the pallet pan in section as associated with material stop means, the pan supporting rollers being in lowered position;

FIG. 6 is another similar view diagrammatically illustrating the operation for transferring a bar member from the pallet pan to a second or elevated conveyor;

FIG. 7 is a view diagrammatically illustrating the conveyor, pallet pan and stop members, together with their actuators, and including the electrical circuitry for the conveyor roller driving motors, and controls for raising and lowering the pallet pan and stop member; and FIG. 8 is a fragmentary perspective view of a pallet pan, showing its details of construction.

DESCRIPTION OF THE PREFERRED EMBODIMENT

Referring more specifically to the drawings, there is illustrated in FIG. 1 an elongate conveyor, as generally indicated at 10, this conveyor being sectionalized to provide a main loading and unloading section 10a, a supply feeder section 10b, and an exit discharge section 10c. The conveyor is of the roller type and in the various sections is provided with elongate main rollers 11 supported in parallel spaced apart relation in conventional bearings on the conveyor frame structure, as generally indicated by the numeral 12. Usually, the rollers will include both idler rollers and power driven rollers, in which case the rollers will be driven from a rotating power means, shown in this case as being an electric motor 13. The motor is preferably connected through appropriate speed reducing mechanism 14 connected with appropriate chain and sprocket drives 15 for rotating the driven rollers. These main rollers operate in the usual manner for transporting structural materials and their containers as will hereinafter appear. In the supply feeder section and the exit discharge section, the main rollers are supported on fixed frames.

The roller arrangement in the main loading and unloading section incorporates a different supporting arrangement for the rollers, as will now be explained. In this section, the main rollers have been separated into one or more groups which are supported in each case on a frame structure 12' arranged to be raised and lowered by an appropriate mechanism as hereinafter described. In addition to the main rollers, the loading and unloading section also has a plurality of auxiliary rollers 16 of shorter length than the main rollers 11. The auxiliary rollers are mounted at irregularly spaced intervals in appropriate bearings carried by a conventional frame structure. In the raised position of the frame 12', the main rollers 11 and auxiliary rollers 16 will be normally disposed at the same operating level, and in this main section, the driving motor 13 is connected to drive both main and auxiliary rollers, although if desired, the main rollers and auxiliary rollers may be separately power driven.

The frame structures 12' are arranged to be raised and lowered by a common actuating mechanism which includes for each frame structure a plurality of crank arms 17 which are supported in pairs upon a common shaft 18, as shown in FIG. 3, this shaft being supported in suitable bearings 19—19 at opposite sides of the conveyor framing. The outermost ends of the crank arms, in each case is provided with a roller 20 which is adapted to bear against a bridging member 21 of the frame structure 12'. Each shaft carries an actuating lever arm 22 which is secured at one end by appropriate means to the shaft, and at its opposite end as by a pivot 23 to an elongate common actuator member 24 which connects at one end with a power delivery element 25 of an air cylinder 26 of conventional construction. With this arrangement, energization of the air cylinder to a retracted position will act to raise the frames 12' and the supported rollers 11, whereas extension of the power delivery element will act to lower the frames 12', these operations being diagrammatically illustrated in FIGS. 4 and 5.

An important feature of the herein disclosed invention resides in the use of a material handling pallet pan, as generally indicated by the numeral 27, and shown in FIG. 8. The pallet pan is constructed of suitable metal or other material to provide an elongate pan having an open top and open ends. The pallet pan is formed with a wall structure consisting of transversely spaced upstanding side walls 28 and 29 which are bridged between their lower margins by a bottom wall 30. The pallet pan is made of appropriate length to correspond compatibly with the main loading and unloading section 10a of the conveyor. The bottom wall of the pallet pan is provided with a plurality of transversely extending slots or openings 31 which are spaced apart in a non-symmetrical or random manner, but at distances corresponding to the spacing of certain associated auxiliary rollers 16 in the loading and unloading section 10a of the conveyor. In this manner, the pan is keyed to the main section at a particular point in which the raising and lowering movements of the pan by means of manipulating the main rollers as previously described may function to relatively move the pan so that the rollers 16 will not project through the openings in the raised position of the pan as shown in FIG. 4, but will project through the openings in the lowered position of the pan as shown in FIG. 5.

It will therefore be seen that the use of a pallet pan permits great flexibility in the loading and unloading operations. For example, a pallet pan, either loaded with material or empty, may be placed on the conveyor at the loading and unloading main section by transporting the pan to the desired position on lifting elements 32—32 which may comprise the arms of a fork lift tractor or a crane fork lift device. Also, an empty or loaded pallet pan may be delivered to the main section via the supply feeder section of the conveyor by properly controlling the operation of the conveyor rollers.

With a pallet pan positioned in the main section as shown in FIG. 4, the rollers of the main section may be operated to controllably shift the pan in opposite directions, as desired, on the conveyor. Moreover, the frames 12' may be lowered, as shown in FIG. 5, to permit the auxiliary rollers 16 to project above the pan bottom. In this position, the pan is anchored against longitudinal movements and the projecting rollers in cooperation with rollers in the supply feeder section and exit discharge section, when necessary, may be utilized to move materials lengthwise into and out of the pallet pan open ends.

When the operation requires that material be moved into the pallet pan via the supply feeder section 10b, provision is made for terminating the material movement at the proper position with respect to the pallet pan. For such purpose, one or more selectable stops, as generally indicated at 33, have been provided adjacent the exit end of the main loading and unloading section. As best shown in FIG. 7, each stop comprises a stop member 34, which may be of plate like or other construction, supported to normally occupy a non-stop position, but connected to a suitable power device, such as an air cylinder 35 which will move the stop member to a stop position, upon being energized from a suitable air pressure source. Energization and deenergization of the air cylinder 35 is controlled by means of a conventional valve 36, this valve being arranged to be controlled from a solenoid 37 through switching means as will hereinafter be described more fully. Provision is made for terminating the power movement on the conveyor of the bar material, the bar material being indicated by the numeral 38, prior to its reaching the selected stop member. This is accomplished by providing a control device, such as a switch 39, in the path of movement of the bar material 38. This switch is placed in advance of the stop member and is normally spring loaded to a closed position in a control circuit for the power means of the conveyor roller drive. Thus it is possible to deenergize the conveyor prior to the material reaching the stop member, whereupon the material will coast to a stop position against the stop member. Also, as will be more fully explained subsequently, provision is made for removing the stop member after a time delay interval following the deenergization of the conveyor power means.

As shown in FIG. 6, the apparatus of the present invention may be operated and controlled to facilitate the movement of pieces of the elongate material from the pallet pan 27 to a second deck or elevated conveyor 40 at the supply feeder end of the loading and unloading main section. This operation is accomplished by placing a raised end of a bar, as indicated at 38', so that it rests upon the first roll, which is preferably power driven, of the elevated conveyor 40, while the other end of the bar rests upon the material in the pallet pan 27. With the frame 12' in raised position, the rollers of the main section are operated in a proper direction to move the loaded pan 27 towards the right as viewed in FIG. 6, or by moving the conveyor 40 towards the left, the bar member 38' may be transported and lodged on the elevated conveyor 40.

The different types of operations, as explained above, have been enumerated merely for the purpose of illustrating the flexibility of the apparatus of the present invention, and these operations are by no means to be considered as exhausting the various operations which may be facilitated by the use of the herein described apparatus.

Referring to FIG. 7, the selective control and circuitry has been diagrammatically illustrated with a view to indicating the operations which contribute to the flexibility of the apparatus of the present invention. For simplicity, the electrical source, as indicated at 41, is a direct current source which simplifies the reversing process of the roller driving motors 13. Reversal of these motors in order to operate in loading and unloading directions is accomplished by means of a double-pole reversing switch 42. In the downward position U, this switch connects the motors for unloading operation, while in the upper position L it connects the motors for a loading operation.

A double-pole single-throw switch 43 is provided to control the apparatus for raising and lowering the pallet pan. This switch connects the electrical source to a control circuit of a solenoid 44 for actuating a valve 45 to positions for controlling the operation of the air cylinder 26 to raise and lower the frame 12' and the associated pallet pan 27.

A double-pole double-throw switch 46 provides for selection of the stops 33—33. In the closed position 1, the solenoid 37 for the first stop is energized to move the stop to an effective stop position. Movement of the switch 46 to its closed position 2 energizes the solenoid 37 to actuate the second stop 33 to its effective stop position.

It will be observed that a limit switch 39 is arranged in front of each stop member, this switch having normally closed contacts 47, which is in the energizing circuit of the driving motors 13. The limit switch is moved to an open contact position in response to engagement by the moving material as it approaches the stop. Prior to reaching the stop, however, the switch 39 opens its contact and deenergizes the motors 13 so that the material may coast to a position against the stop member. The stop member is automatically moved to a nonstop position at a predetermined time interval after deenergization of the driving motors 13. This is accomplished by providing a time delay opening relay 48 which is connected across the energizing circuit for the motors 13, this relay having normally open contacts 49 which are in the energizing circuit of the solenoids 37—37 for controlling the operation of the stops. Thus, after a time delay following the deenergization of the motors 13, the relay 48 opens its contacts 49 so as to effect movement of the selected stop to a non-stop position subsequent to its being engaged by the traveling material 38.

While manually operable switches 42, 43 and 46 have been illustrated for controlling the operations, it will be understood that push button controls may be utilized without changing the concept of the invention.

From the foregoing description and drawings, it will be clearly evident that the delineated objects and features of the invention will be accomplished.

Various modifications may suggest themselves to those skilled in the art without departing from the spirit of our invention and hence, we do not wish to be restricted to the specific form shown or uses mentioned, except to the extent indicated.

We claim:

1. Material handling equipment, comprising:
   a. an elongate conveyor including a plurality of longitudinally spaced transversely extending rollers, said conveyor having a main loading and unloading section;
   b. a material handling elongate pallet pan adapted to be moved to a position on said conveyor main section, said pan having an open top and ends defined by an axially extending wall structure including a bottom wall for supporting the pan on the rollers at said main station; and
   c. means operable to relatively position the pallet pan and rollers at said main section so that portions of certain of said main section rollers will project above the plane of said bottom wall.

2. Material handling equipment according to claim 1, wherein said pan bottom wall is provided with transversely extending spaced apart openings to respectively receive the projecting portions of said rollers.

3. Material handling equipment according to claim 2, wherein the spacings between said wall openings and the spacings between the rollers receivable therein are correspondingly positioned to provide a predetermined keyed position for the pallet pan at the main section.

4. Material handling equipment according to claim 2, wherein said means includes selectively operable fluid power actuated means for raising and lowering said pan.

5. Material handling equipment according to claim 1, wherein the projecting portions of said rollers hold said pan against axial movement, and including stop means adjacent one end of the main loading and unloading section, said stop means being operable to interrupt material movement by said projecting rollers on said conveyor at a predetermined desired position in relation to said main section.

6. Material handling equipment according to claim 5, wherein said stop means includes spaced apart plate members respectively mounted for movements into and out of a stop position in the conveying movement path; and selectively operable fluid power actuated means for moving said plates.

7. Material handling equipment according to claim 5, including power means energizable to rotatably drive said certain of said main section rollers to move material towards said stop means; and control means operable in response to movement of said material for interrupting the energization of said power means prior to the material reaching the stop means.

8. Material handling equipment according to claim 7, wherein the power means includes an electric motor having an energizing circuit, and the control means comprises a normally closed limit switch in an energizing circuit of said motor, said switch being operable to an open position by said material.

9. Material handling equipment according to claim 7, including means for actuating said stop means to a non-stop position after a time delay interval following the interruption of the energization of said power means.

10. Material handling equipment, comprising:
    a. an elongate conveyor having a main loading and unloading section and a plurality of spaced transversely extending rollers, the rollers in said main section comprising a plurality of relatively long and short rollers;
    b. a material handling elongate pallet pan adapted to be moved to a position on said conveyor main section, said pan having an open top and ends defined by an axially extending wall structure including a bottom wall having transversely extending spaced apart openings;
    c. said long rollers being supportingly engageable with said pan bottom wall, and the short rollers being of a size to project into said openings above the plane of said bottom wall; and
    d. means operable to relatively position the pallet pan and rollers at said main section including elements operable to lower the long rollers and supported pallet pan below the level of the short rollers and return the same to such level.

11. Material handling equipment according to claim 10, including power means energizable to rotatably drive the long rollers and the short rollers, whereby with the long and short rollers at a corresponding level, said rollers are operable to move the pallet pan endwise on said conveyor, and with the long rollers lowered the short rollers are operable to relatively move material only in the pallet pan.

* * * * *